United States Patent [19]

Charpak

[11] 4,317,038

[45] Feb. 23, 1982

[54] DEVICE FOR DETERMINING THE SPATIAL DISTRIBUTION OF RADIATION

[75] Inventor: Georges Charpak, Paris, France

[73] Assignee: Agence Nationale de Valorisation de la Recherche, Neuilly-sur-Seine, France

[21] Appl. No.: 133,094

[22] Filed: Mar. 24, 1980

[51] Int. Cl.3 .................................... G01T 1/18

[52] U.S. Cl. .................................... 250/385

[58] Field of Search .................................... 250/385

[56] References Cited

U.S. PATENT DOCUMENTS

| | | | |
|---|---|---|---|
| 3,786,270 | 1/1974 | Borkowski et al. | 250/385 |
| 4,031,396 | 6/1977 | Whetten et al. | 250/385 |
| 4,047,041 | 9/1977 | Houston | 250/385 |
| 4,076,981 | 2/1978 | Sparks et al. | 250/385 X |
| 4,119,853 | 10/1978 | Shelley et al. | 250/385 |
| 4,179,608 | 12/1979 | Walenta | 250/385 |
| 4,193,000 | 3/1980 | Shirayama et al. | 250/385 |

OTHER PUBLICATIONS

Charpak et al., "The Spherical Drift Chamber for X-Ray Imaging Applications", Nuclear Instruments and Methods 122, 1974, pp. 307–312.

*Primary Examiner*—Davis L. Willis

*Attorney, Agent, or Firm*—Larson and Taylor

[57] ABSTRACT

The spatial distribution of mono-energetic x-rays from a point source, is determined by a device which comprises a gas filled enclosure having a flat radiation entrance window. Flat electrodes establish an electrical field of such amplitude that there occurs conversion of said radiation into photo electrons and avalanche electron multiplication resulting in delivery of a burst or pulse of electrons per conversion whose height is an increasing function of the travel path of the electrons avalanche from the location of the conversion event to the planar outlet electrode. A detector located in a second portion of the enclosure receives the pulse of electrons and determines the coordinates and the pulse height of the pulse.

9 Claims, 3 Drawing Figures

DEVICE FOR DETERMINING THE SPATIAL DISTRIBUTION OF RADIATION

BACKGROUND AND SUMMARY OF THE INVENTION

The invention relates to determination of the spatial distribution of substantially mono-energetic neutral radiation, particularly X-rays, emanating from a point source and has potential application in the fields of X-ray diffraction, nuclear medicine and nuclear physics. For instance, it is suitable for use in detection of the spatial distribution of X-rays diffracted by a crystal or received through a pin-hole collimator.

Multiwire gas-filled proportional counters have been used for X-ray imaging. In such counters, each X-photon is converted into a burst of electrons due to the avalanche caused by the ionisation electrons in the vicinity of the counterwire. However, satisfactory yield makes it necessary to provide a gas volume of substantial thickness. If flat electrodes are used, there occurs substantial errors and uncertainties regarding the location of the ionising events caused by X-rays directed at an angle from the axis of the counter.

For overcoming that difficulty, it has been suggested to use cylindrical or part-spherical electrodes, as described for instance in U.S. Pat. No. 3,786,270 (Borkowski et al) and a paper by G. HARPAK et al in Nuclear Instruments and Methods 122 (1974) 307–312, North Holland Publishing Co. Then the electrons drift radially in the same direction as the incident X-rays and imaging may be satisfactory. On the other hand, construction of the detector is rendered more complex.

It is an object of the invention to provide an improved device for determining the spatial distribution of neutral radiation originating from a point source, such as a diffracting crystal or a pin-hole collimator, based on photon-electron conversion and avalanche multiplication.

It is another object to provide a device which is simple in construction and has satisfactory resolution, accuracy and efficiency.

A device according to the invention comprises a gas filled enclosure having a flat entrance window transparent for the radiation to be detected, typically X-rays. Flat field electrode means establish in a first portion of the enclosure an electrical field of such amplitude that conversion of said radiation occurs and avalanche electron multiplication results in delivery of a pulse of electrons per conversion whose pulse height is an increasing function of the travel path of the electron avalanche from the location of the conversion to the outlet field electrode of said first portion. Detector means located in a second portion of the enclosure are arranged to receive said pulse of electrons through said outlet electrode and to determine the coordinates of the pulse in said outlet electrode and the pulse height of said pulse.

While such a construction is simple, it makes it possible to compute the depth of the ionizing event in the first portion and to remove the uncertainty due to the lack of that indication in prior art systems having flat electrodes. Computation of the location and of the angular position of the original X-ray can be made using conventional analogue or digital electronics.

If the incident photons have a sufficient energy (typically 10 keV or more), sufficient amplification may be obtained in the conversion space for obtaining pulse heights which may be subjected to pulse height analysis and determination of the centroid and thereby provide acceptable resolution. For lower energy however, an electron drift or transfer space will be provided between the first and second portions. Electron transfer will occur through that space with a sufficient yield (typically 20 to 40%) and substantially linear amplification if the gas has been property selected. It has been found that a mixture of 95% Ar-5% $C_3H_8$ or Xe-$(C_2H_5)_3N$ generally gives satisfactory result.

The detector means may use any one of a number of well-known approaches providing a predetermined amplification factor; it may consist of a multiwire proportional chamber associated with delay lines, current dividing circuits, analogue centroid computation circuits, digital computers, etc. Determination of the depth Z of the ionising events may then be made based on a measurement of the pulse height and used for determining parallax. Another method, using parallel wires at different levels, may also be used.

Other aspects, advantages and features of the invention will appear from the following description of a particular embodiment, with reference to the accompanying drawings.

SHORT DESCRIPTION OF THE DRAWINGS

DETAILED DESCRIPTION OF PARTICULAR EMBODIMENTS

Figure 1:
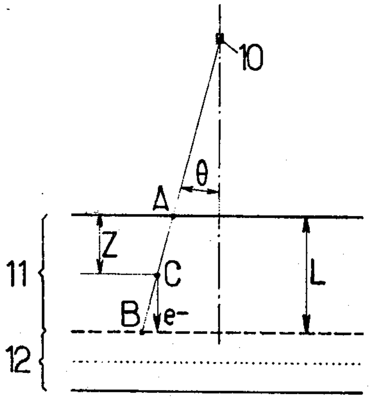
FIG. 1 is a schematic diagram of a detector illustrating the parallax error which may result from obliquity of an X ray to be detected.

Referring to FIG. 1, there are shown the basic elements of a multiwire proportional chamber receiving X-rays from a point source 10, for instance a rotating crystal irradiated by X-rays.

The chamber includes a X-ray/electron conversion and electron drift volume 11 and a multiwire detector. A sufficient efficiency is obtained only if the thickness L of the conversion volume is large. Since conversion may take place anywhere along AB on the path of an X-ray at an angle $\theta$ with the axis of the chamber, there is an uncertainty or maximum error L.tg $\theta$ on the lateral location C of the interaction or ionizing event, as the conversion electrons e- move perpendicularly to the planes of the flat electrodes of the chamber. The error can be computed and corrected only if the depth Z is known.

Figure 2:
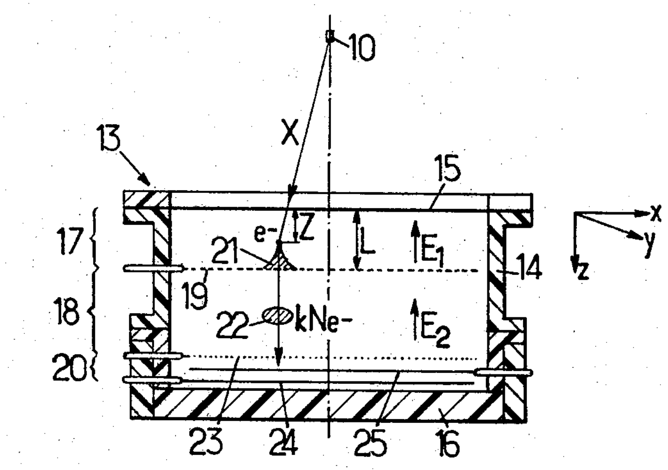
FIG. 2 is a schematic diagram of the essential components of a detecting device according to the invention.

Referring now to FIG. 2 (which is not to scale) there is shown a device 13 for detecting X-rays having a narrow spectral width, providing an indication representative of Z. It will be assumed that the device is for detection of soft X-rays, typically of about 8 KeV.

The detector of FIG. 2 comprises an air-tight enclosure filled with an appropriate gas, typically a noble gas with a small content of an organic gas. In this illustrated embodiment, the sidewall 14 consists of several rings sealingly retained against each other by connecting means (not shown). The enclosure is closed by a bottom wall 16 and a flat radiation entrance window 15 whose thickness and constituting material (typically a thin sheet of plastic material or light alloy) are selected for transparency to the X-rays to be detected.

A first set of flat electrodes define a first or conversion space 17 in the enclosure, where the X-rays are absorbed and give way to photoelectrons. Space 17 has a thickness sufficient to convert the major part of the incidental X-rays into photoelectrons. In practice, the thickness will in general be from one to a few centimeters. It is subjected to an electric field $E_1$ of about 7 to 10 hundred K volts per centimeter, at atmospheric pressure, for causing ionizing collision with the photoelectrons and drift of the additional electrons which they produce towards the second space 18. In the embodiment shown in FIG. 2, the electrodes comprise a first electrode formed by the entrance window 15 (whose rear face is metallized if it is made from an insulating material), connected to earth potential, and grid electrode 19 connected to a source of positive voltage.

The value of the uniform electric field $E_1$ is selected for causing avalanche multiplication of the initial photon electron caused by conversion. However, the gain should not exceed a moderate value, typically up to $10^5$, for the multiplication factor N to be approximately an exponential function of the distance L−Z on which avalanche multiplication develops:

$$N = exp\,[\alpha(L-Z)]$$

$\alpha$ is a coefficient which depends on the nature of the filling gas and on the value of the field.

Theoretically, measuring the number of avalanche electrons, i.e. the pulse height in a conventional detector collecting the ionization electrons, would provide an indication on the value of Z. However, with X-rays of moderate or low energy, the gain provided by space 17 is not sufficient for accurate determination of the pulse height and lateral coordinates of the ionizing event along x and y (FIG. 2).

In the embodiment of FIG. 2, the difficulty is overcome by limiting the gain in space 17 to a moderate value, typically about $10^3$ (i.e. about 15 to 20% on half height width for X-rays of 6keV) and transferring the avalanche electron cloud through a second or transfer space 18 to a detector space where there is multiplication of the electrons produced in space 17.

It has been found that substantially proportional transfer through space 18 to a detector 20 takes place with a sufficient yield, typically 20 to 40% if:

the filling gas is properly selected, Ar with 5% of $C_3H_8$ and Xe with a low amount of $(C_eH_5)_3N$ being satisfactory, and the mesh size of grid 19 should be small as compared with the lateral size of the cloud resulting from avalanche multiplication, as indicated at 21, typically lower than 1 mm.

Then the avalanche, which expands laterally due to diffusion and ionization resulting from the UV photons will distribute the electrons so that the wires of grid 19 absorb a constant percentage of the electrons.

The transfer space is subjected to a field $E_2$ of from 0.5 to 1.5 kV/cm, typically of about 1 kV/cm; each electron cloud 22 of kN electrons resulting from a ionizing event (k being the transfer factor of space 18) is delivered to detector 20.

In the embodiment of FIG. 2, detector 20 is illustrated as a multiwire proportional chamber having two cathodes 23 and 24 each made of parallel wires and an anode 25 consisting of wires orthogonal to the wires of cathode 23 and parallel to the wires of cathode 24 and located between the cathodes. The location of the centroid of the electron cloud may be measured using well known techniques, for instance as described in the paper by G. HARPAK et al referred to above. The voltages applied to the electrodes in detector 20, of small thickness (typically about 1 cm), are such as to ensure an overall or cumulative gain of $10^5$ to $10^6$.

As an example, space 17 may be 1 cm thick and provide a maximum gain $N_o\,exp\,(\alpha)=1000$.

Then $\alpha=6{,}90$ electrons/cm.

The pulse height due to a photon which would result in $N_o$ electrons with the event at distance Z from the entrance window is:

$$N = No.\ exp.\ \alpha(L-Z)$$

with $$dN/N = -\alpha dZ$$

If the energy resolution of the detector is 25% (total width at half-height), the absolute value of the spatial resolution dZ is:

$$/dZ/ = 0.25/6{,}9 = 0{,}036 \text{ cm}$$

In other words, the depth Z may be measured with a precision better than 400 $\mu$m.

As indicated above, if the X rays have a sufficient energy (typically higher than 10 KeV), the amplification in space 17 may exceed $10^4$ and is then sufficient for measuring the pulse height and the centroid of the avalanches without transfer. Then there is no necessity to use a gas selected for appropriate transfer, but the electronic circuit should have increased sensitivity.

Figure 3:
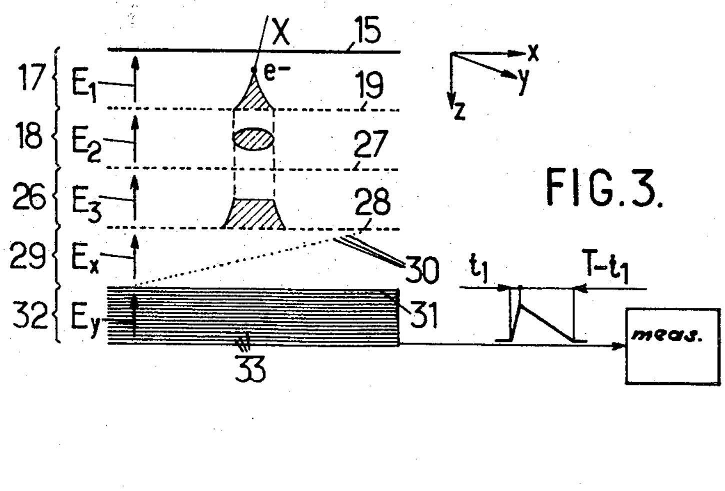
FIG. 3 is a schematic diagram of a fraction of a modified embodiment.

In the modified embodiment of the invention illustrated in FIG. 3 (where the elements shown in FIG. 2 are designated by the same reference numeral), determination of the coordinates x and y is made by time measurement. Flat grids 27 and 28 are provided which define an amplification space 26 and create an electrical field $E_3$. The electrons are transferred through grid 28 into an x localization space where prevails a field Ex, while E3 has the same order of magnitude as E1, tex is typically about 1kv/cm. A set of electrode wires 30 orthogonal to direction x are located in space 29, distributed at equal intervals along direction x and at a distance from grid 28 increasing by equal steps having a predetermined value. Each wire 30 is set at a D.C. voltage equal to the voltage which would prevail at the same place if the wire were omitted. Distribution of the voltages may easily be achieved by a resistor bridge having a series of intermediate taps between grids 28 and 31 limiting space 29. Consequently the electric field is constant, except in the immediate vicinity of the wires.

The electron cloud will move through space 29. Part of the electrons will be collected by the wires and part of them will reach grid 31 which has a high degree of transparency to electrons and traverse it.

Pulses will be induced in those wires 30 which are on the path of the cloud. The shape of the pulse collected by a circuit connected to all wires will typically exhibit a linearly rising ramp for a time $t_1$ and a linearly falling ramp for a time $t_2=T-t_1$, where T is a constant and $t_1$ is a function of x. Typically the delay is of about 200 ns/cm. If the thickness of 29 is 2 cm and time is measured with an accuracy of 1 ns, then the accuracy is 1/400 on the length of the set of wires, i.e. 0.5 mm for a detector 20 cm wide.

The same measurement is carried out in a second space 32 locating a second set of wires 33 orthogonal to wires 30.

It appears from the above that measurement of coordinates x and y is carried out with only two time measurement circuits, while coordinate z is determined by pulse height measurement, and permits correction to determine angle $\theta$.

I claim:

1. A device for determining the spatial distribution of mono-energetic neutral radiation from a point source, comprising:

a gas-filled enclosure having a flat radiation entrance window, a flat outlet field electrode in said enclosure for establishing in a first portion of said enclosure an electrical field of such amplitude that there occurs conversion of said radiation and avalanche electron multiplication resulting in delivery of a pulse of electrons per conversion whose pulse height is an increasing function of the travel path of the electron avalanche from the location of the conversion to said outlet electrode of said first portion, and detector means, located in a second portion of said enclosure, for receiving said pulse of electrons through said outlet electrode and for determining the coordinates of the pulse in said outlet electrode and the pulse height of said pulse.

2. A device according to claim 1, further comprising electrode grids in said enclosure for constituting between said first and second portions, an electron drift chamber where an electrical field prevails having a value selected to provide substantially linear amplification of said electron pulse.

3. A device according to claim 2, for determining the spatial distribution of soft X-rays, wherein said gas is selected from the group consisting of Ar—$C_3H_8$ and Xe–$(C_2H_5)_3N$.

4. A device according to claim 1, wherein said outlet electrode is a metal grid having a mesh size which is small with respect to the cross-sectional area of the avalanche across said outlet electrode.

5. A device according to claim 4, wherein said mesh size is lower than 1 mm and the thickness of said portion is about 1 cm.

6. A device according to claim 1, wherein said detector means is a flat multiwire proportional chamber.

7. A device according to claim 6, wherein said chamber is associated with electronic means for computing the coordinates of the centroid of each avalanche pulse.

8. A device according to claim 1, 2 or 4, wherein said detector means comprises:

a first grid electrode, consisting of a set of first wires parallel to a predetermined x direction and to the plane of said outlet electrode, each of said first wires being at a distance from said outlet electrode different from the distances of all other first wires, a second grid electrode, consisting of second wires, parallel to a y direction orthogonal to the x direction and parallel to the plane of said outlet electrode, each of said second wires being at a distance from said outlet electrode different from the distances from all other second wires, means associated with said first and second grid electrodes for establishing an electric field causing electron movement across said detector means.

first electronic means associated with said first wires for measuring the time durations of rise and fall of each pulse induced by an avalanche in said first wire and computing the cordinate of the avalanche in the y direction from said time durations, and second electronic means associated with said second wires for measuring the time duration of the rise and fall of each pulse induced by an avalanche on said second wires and computing the coordinate of the avalanche in the x direction from said time durations.

9. A device according to claim 1, 2 or 4, wherein said detector means comprise electronic computing means for computing the location of each said conversion event from said coordinates and said pulse height.

* * * * *